United States Patent [19]
McCoy

[11] Patent Number: 6,147,984
[45] Date of Patent: Nov. 14, 2000

[54] METHOD AND APPARATUS FOR PEAK LIMITING IN A MODULATOR

[75] Inventor: James Wesley McCoy, Irving, Tex.

[73] Assignee: Motorola, Inc., Schaumburg, Ill.

[21] Appl. No.: 09/291,768

[22] Filed: Apr. 14, 1999

[51] Int. Cl.[7] .................................................. H04J 13/00
[52] U.S. Cl. ........................................... 370/343; 370/342
[58] Field of Search ..................................... 370/343, 480, 370/441, 442, 341, 342, 344, 345, 347, 349, 350, 337, 336, 335, 319, 320, 321, 389, 503, 206, 205, 20, 211–215, 465, 288; 455/516, 509, 130, 131, 139; 375/130, 145, 237, 238–239, 279, 280, 268, 269, 271, 261, 296

[56] References Cited

U.S. PATENT DOCUMENTS 5,659,891  8/1997  Hays et al. .............................. 370/343
5,970,058  10/1999  DeClerk et al. ......................... 370/342

*Primary Examiner*—Dang Ton
*Attorney, Agent, or Firm*—R. Louis Breeden

[57] ABSTRACT

A modulator (102) generates a frequency-multiplexed composite signal (502) including a plurality of symbols. A processing system (108) of the modulator defines (802) a signal template (600) specifying symbol-type adjustment factors for corresponding symbol types, and then locates (804) in the composite signal a portion of the signal whose amplitude exceeds a predetermined threshold by an amplitude excess. The processing system records (806) the amplitude excess, the phase angle, and a time of the portion; and determines (808) an input symbol corresponding to the time, the input symbol being of a symbol type. The processing system adjusts (810) the input symbol in accordance with one of the plurality of symbol-type adjustment factors corresponding to the symbol type, and further in accordance with the amplitude excess and the phase angle, thereby bringing the amplitude below the predetermined threshold.

15 Claims, 5 Drawing Sheets

METHOD AND APPARATUS FOR PEAK LIMITING IN A MODULATOR

FIELD OF THE INVENTION

This invention relates in general to wireless communication systems, and more specifically to a method and apparatus for peak limiting in a modulator.

BACKGROUND OF THE INVENTION

Wireless telecommunications systems sometimes are divided into a series of cell areas covering a service area. Each cell area has a transmitting base station using an operating frequency set comprising a plurality of radio channels to communicate with mobile subscribers. Each channel represents an information signal at a particular frequency carrier or band.

In many instances it is advantageous to combine these channels for transmission purposes. The channels can all be combined by a broadband signal combiner into a multi-subchannel signal at low power levels and then amplified by a single linear amplifier (or its equivalent, a plurality of linear amplifiers in parallel, each amplifying a reduced power version of the same multi-subchannel signal) to raise the multi-subchannel signal to an appropriate transmit power level.

Peak to average ratio compression is a technique of improving average power levels from a transmitter with limited peak power capability. Traditionally, this has been accomplished with adaptive gain control and clipping. These techniques create frequency domain splatter and increase the noise floor of the transmitted signal. In addition, such techniques are not very useful for amplitude modulated signals, which require a high degree of linearity. Furthermore, different types of signals can tolerate different amounts of distortion and thus different amounts of compression. Prior-art techniques have not attempted to tailor symbols on multiple subchannels, including empty subchannels, in a controlled, individualized manner to improve the peak to average power ratio.

Clearly then, a need exists for an improved method and apparatus for peak limiting in a modulator. Preferably, the method and apparatus will allow control of the compression in accordance with the type of information being sent and will tailor symbols on multiple subchannels, including empty subchannels, in a controlled, individualized manner to improve the peak to average power ratio.

SUMMARY OF THE INVENTION

An aspect of the present invention is a method for peak limiting in a modulator that generates a frequency-multiplexed composite signal including a plurality of symbols. The method comprises the steps of defining a signal template specifying a plurality of symbol-type adjustment factors for a corresponding plurality of symbol types, and locating in the frequency-multiplexed composite signal a portion of the frequency-multiplexed composite signal whose amplitude exceeds a predetermined threshold by an amplitude excess. The method further comprises the steps of recording the amplitude excess, a phase angle, and a time of the portion; and determining an input symbol corresponding to the time, the input symbol being of a symbol type. The method also includes the step of adjusting the input symbol in accordance with one of the plurality of symbol-type adjustment factors corresponding to the symbol type, and further in accordance with the amplitude excess and the phase angle, thereby bringing the amplitude below the predetermined threshold.

Another aspect of the present invention is a peak limiter for peak limiting in a modulator that generates from input symbols a frequency-multiplexed composite signal including a plurality of symbols. The peak limiter comprises a processing system coupled to the frequency-multiplexed composite signal for processing the input symbols to peak limit the frequency-multiplexed composite signal. The processing system is programmed to define a signal template specifying a plurality of symbol-type adjustment factors for a corresponding plurality of symbol types, and to locate in the frequency-multiplexed composite signal a portion of the frequency-multiplexed composite signal whose amplitude exceeds a predetermined threshold by an amplitude excess. The processing system is further programmed to record characteristics including the amplitude excess, a phase angle, and a time of the portion, and to determine an input symbol corresponding to the time, the input symbol being of a symbol type included in the plurality of symbol types. The processing system is also programmed to adjust the input symbol in accordance with one of the plurality of symbol-type adjustment factors corresponding to the symbol type, and further in accordance with the amplitude excess and the phase angle, thereby bringing the amplitude below the predetermined threshold.

Another aspect of the present invention is a transmitter for generating an amplified radio frequency (RF) signal. The transmitter comprises a modulator for generating from input symbols a frequency-multiplexed composite signal including a plurality of symbols, and an upconverter coupled to the modulator for upconverting the frequency-multiplexed composite signal to generate an RF signal. The transmitter further comprises a power amplifier coupled to the upconverter for amplifying the RF signal to produce the amplified RF signal. The modulator includes a peak limiter comprising a processing system coupled to the frequency-multiplexed composite signal for processing the input symbols to peak limit the frequency-multiplexed composite signal. The processing system is programmed to define a signal template specifying a plurality of symbol-type adjustment factors for a corresponding plurality of symbol types, and to locate in the frequency-multiplexed composite signal a portion of the frequency-multiplexed composite signal whose amplitude exceeds a predetermined threshold by an amplitude excess. The processing system is further programmed to record characteristics including the amplitude excess, a phase angle, and a time of the portion; and to determine an input symbol corresponding to the time, the input symbol being of a symbol type included in the plurality of symbol types. The processing system is also programmed to adjust the input symbol in accordance with one of the plurality of symbol-type adjustment factors corresponding to the symbol type, and further in accordance with the amplitude excess and the phase angle, thereby bringing the amplitude below the predetermined threshold.

DETAILED DESCRIPTION OF THE DRAWINGS

Figure 1:
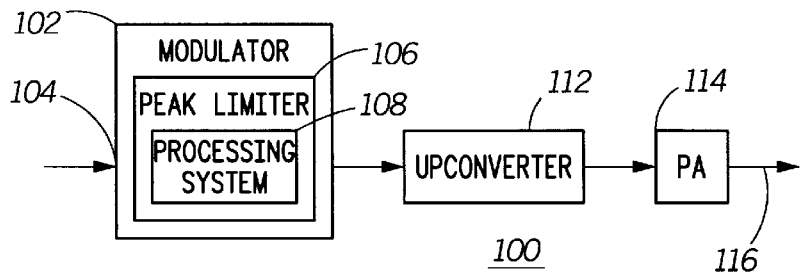
FIG. 1 is an electrical block diagram of an exemplary transmitter in accordance with the present invention.

FIG. 1 is an electrical block diagram of an exemplary transmitter 100 for generating an amplified radio frequency (RF) signal in accordance with the present invention. The transmitter 100 comprises a modulator 102 for generating from input symbols received at an input 104 a frequency-multiplexed composite signal including a plurality of symbols. The term "symbols" as used herein is meant to include both data symbols and samples of an analog signal, such as samples of an audio or video signal. The modulator 102 is coupled to a conventional upconverter 112 for upconverting the frequency-multiplexed composite signal to generate an RF signal. The upconverter 112 is coupled to a conventional power amplifier 114 for amplifying the RF signal to produce the amplified RF signal. The portions of the modulator 102 that generate the frequency-multiplexed composite signal from the input symbols are preferably similar to the modulation engine disclosed in U.S. patent application Ser. No. 09/176,781 filed Oct. 22, 1998 by McCoy, entitled "Apparatus for performing a non-integer sampling rate change in a multichannel polyphase filter." Said Patent Application is hereby incorporated herein by reference.

The modulator 102 comprises a peak limiter 106 in accordance with the present invention. The peak limiter 106 comprises a processing system 108 coupled to the frequency-multiplexed composite signal and having access to a memory (not shown) containing the input symbols for processing the input symbols to peak limit the frequency-multiplexed composite signal. The processing system 108 is preferably a model DSP56800 digital signal processor, manufactured by Motorola, Inc. of Schaumburg, Ill., and executes software readily written by one of ordinary skill in the art, given the teachings of the instant disclosure. It will be appreciated that, alternatively, other similar DSPs can be substituted for the DSP56800. It will be further appreciated that, alternatively, some or all of the processing system 108 can be realized in hardware instead of through software programming of a DSP. In addition, it will be appreciated that, in one embodiment, the processing system 108 performs all the processing functions required in the modulator 102, in addition to the peak limiter functions. Operation of the processing system 108 in accordance with the present invention will be described further below.

Figure 2:
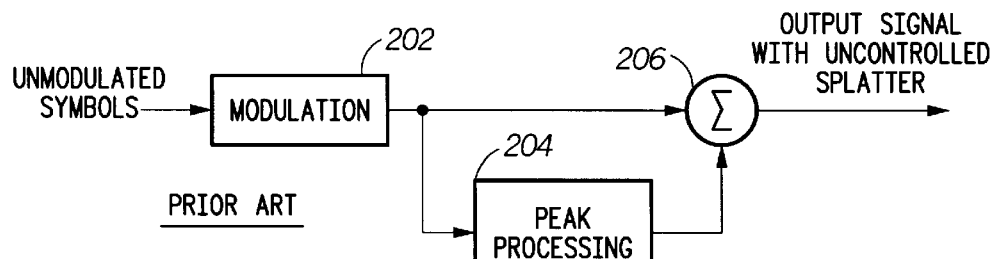
FIG. 2 is an electrical block diagram depicting a prior art peak limiting technique.

FIG. 2 is an electrical block diagram depicting a prior art peak limiting technique. In the prior art technique a modulation element 202 modulates unmodulated symbols to generate a composite modulated signal. The modulated signal is coupled to a peak processing element 204, which makes adjustments in a summer 206 to limit the peaks of the modulated signal, thereby causing uncontrolled splatter in the output signal.

Figure 3:
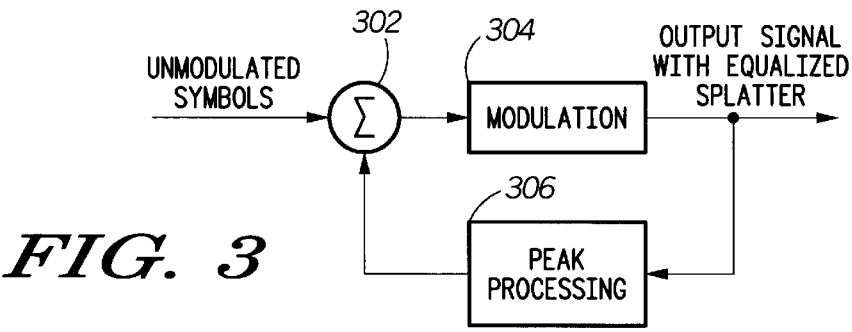
FIG. 3 is an electrical block diagram depicting a peak limiting technique in accordance with the present invention.

FIG. 3 is an electrical block diagram depicting a peak limiting technique in accordance with the present invention. Here, unmodulated symbols are adjusted in a summer 302 by calculated adjustments determined by a peak processing element 306. Because the adjustment takes place prior to modulation by a modulation element 304 the amount and location of the splatter introduced into the output signal is advantageously controlled within desired limits, in accordance with the present invention, as will be explained further below.

The functionality of the peak limiter 106 can be broken into computational and control components. The computational components include the core modulator and the symbol adjustment computation. The control components include the iteration and time alignment of the algorithm.

Figure 4:
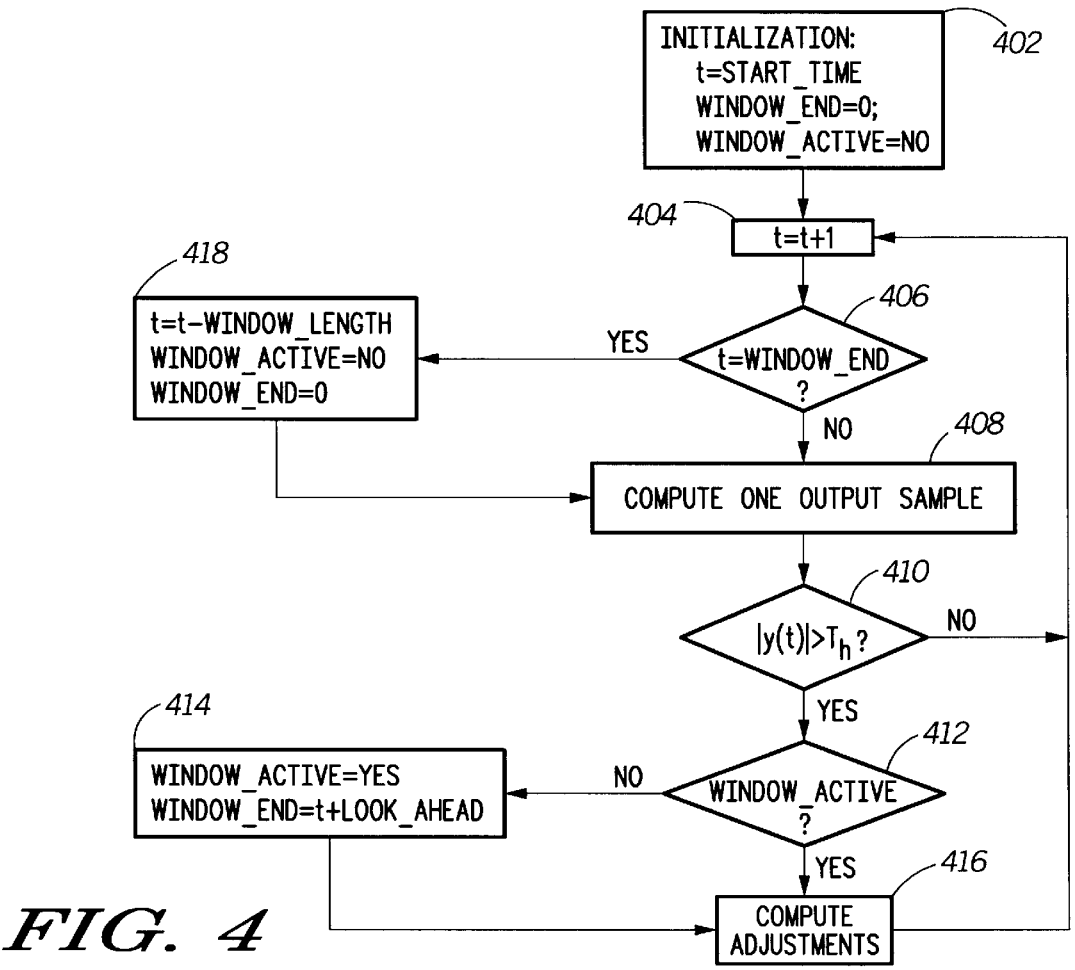
FIG. 4 is a flow diagram depicting a signal flow of an exemplary peak limiter in accordance with the present invention.

FIG. 4 is a flow diagram depicting the signal flow of an exemplary peak limiter in accordance with the present invention. Briefly, the processing system 108 computes samples of the frequency-multiplexed composite signal at the output of the modulator 102 until it finds a sample that exceeds a predetermined threshold. In response, the processing system 108 activates a "window" of predetermined length in which it continues to compute additional samples of the frequency-multiplexed composite signal and compare them with the threshold. For every sample that is above the threshold, the processing system 108 preferably computes adjustments to the input symbols that are contributing to the peak in the frequency-multiplexed composite signal, the adjustments forming a coherent reduction in the amplitude of the peak. When the end of the window is reached, the processing system iterates the process just described, beginning a predetermined amount earlier than the location of the first sample that exceeded the threshold. The process preferably continues until no further peaks above the threshold are found.

In somewhat greater detail, the flow diagram of FIG. 4 begins with an initialization step 402, in which a sample index t is set to START_TIME, for preparing to compute the first output data sample; WINDOW_END is set to 0; and WINDOW_ACTIVE is set to NO. Then in step 404, the processing system 108 increments the sample index t. In step 406 the processing system 108 checks whether t is equal to WINDOW_END. If not, the processing system 108 computes 408 one output sample. The processing system 108 then checks 410 whether the computed output sample exceeds the predetermined threshold. If not, the processing system 108 returns to step 404 to continue looking for a peak above the threshold. If, on the other hand, in step 410 the processing system 108 finds that the computed output sample is above the threshold, then the processing system 108 checks 412 whether WINDOW-ACTIVE is set to YES or NO. If NO, the processing system 108 sets WINDOW_ACTIVE to YES, and sets WINDOW_END to t+LOOK_AHEAD, LOOK_AHEAD being a predetermined value controlling the length of the window after the sample representing the first peak above the threshold is found. Flow then moves to step 416 to compute the adjustments (as described herein below) to all input symbols contributing to the peak, i.e., the input symbols sufficiently close in time to that of the peak to affect the peak, .g., symbols within ±3 symbol periods of the peak on all subchannels. If, on the other hand, at step 412 the decision is YES, the flow moves immediately to step 416 to compute the adjustments. In either case, the flow then returns to step 404 to search for the next output value above the threshold.

When the process has continued long enough for t to equal WINDOW_END, at step 406 the flow moves to step 418, where t is reset to (t−WINDOW_LENGTH), WINDOW_ACTIVE is set to NO, and WINDOW_END is set to 0.

Flow then continues to step 408 to compute another output sample. Preferably, the predetermined value, WINDOW_LENGTH, is larger than LOOK_AHEAD by a predetermined number of symbols. This assures that the next window will start before the previously located first peak, as some symbols immediately before the first peak may have been adjusted in the process of reducing the first peak, and may be causing new peaks above threshold in their vicinity. The predetermined number of symbols is preferably equal to $$2(N_t - 1)\frac{R_o}{R_i},$$

rounded to the nearest integer, where $N_t$ is the number of taps per phase of the pulse shaping filter, $R_o$ is the output rate, and $R_i$ is the input rate.

Figure 5:
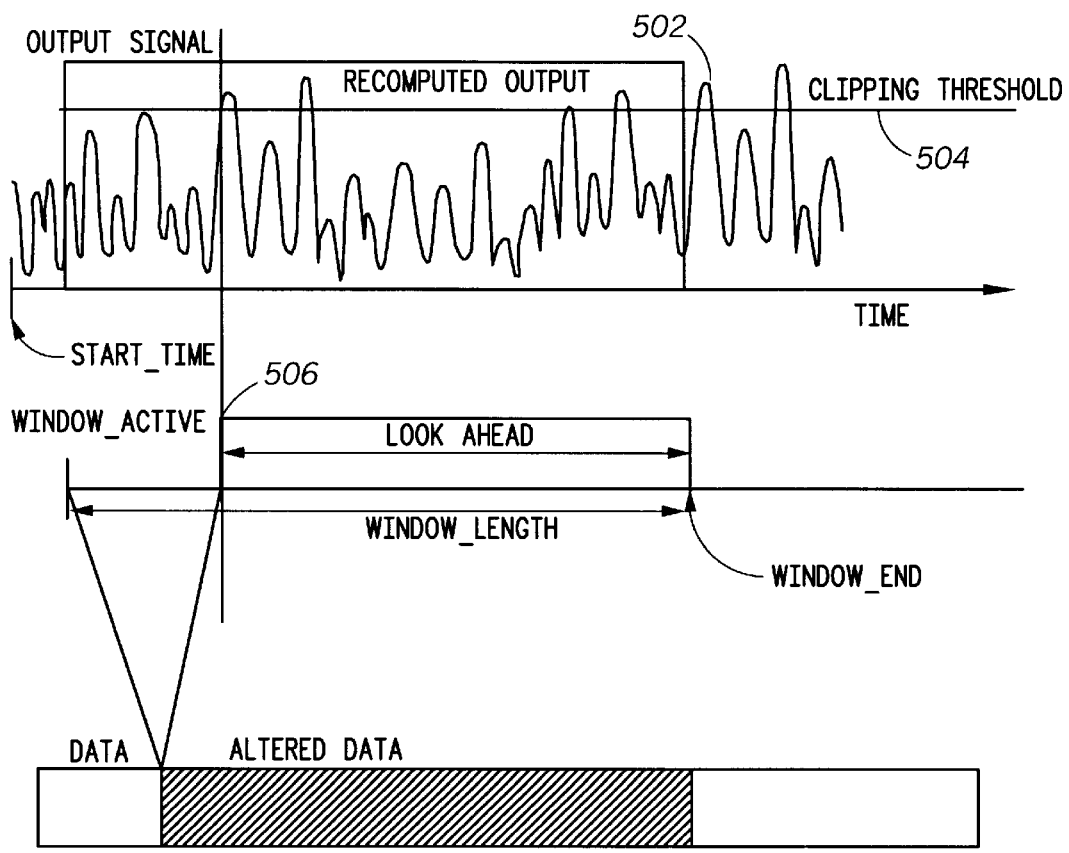
FIG. 5 is a timing diagram depicting operation of the exemplary peak limiter in accordance with the present invention.

FIG. 5 is a timing diagram depicting operation of the exemplary peak limiter in accordance with the present invention. The timing diagram helps to understand what takes place during the flow diagram of FIG. 4. The timing diagram depicts the frequency-multiplexed composite signal 502 generated by the modulator 102, and the predetermined clipping threshold 504. Note that the window goes active 506 when the frequency-multiplexed composite signal 502 crosses the threshold 504 the first time after beginning a search for a peak above the threshold 504. The processing system 108 then continues to search for additional times that the frequency-multiplexed composite signal 502 is above the threshold 504, until reaching the end of the window. After reaching the end of the window, the processing system 108 resets the symbol index t to (t−WINDOW_LENGTH) to ensure that the next computed values for the output samples include all of the input symbols that may have been adjusted in the previous iteration.

Figure 6:
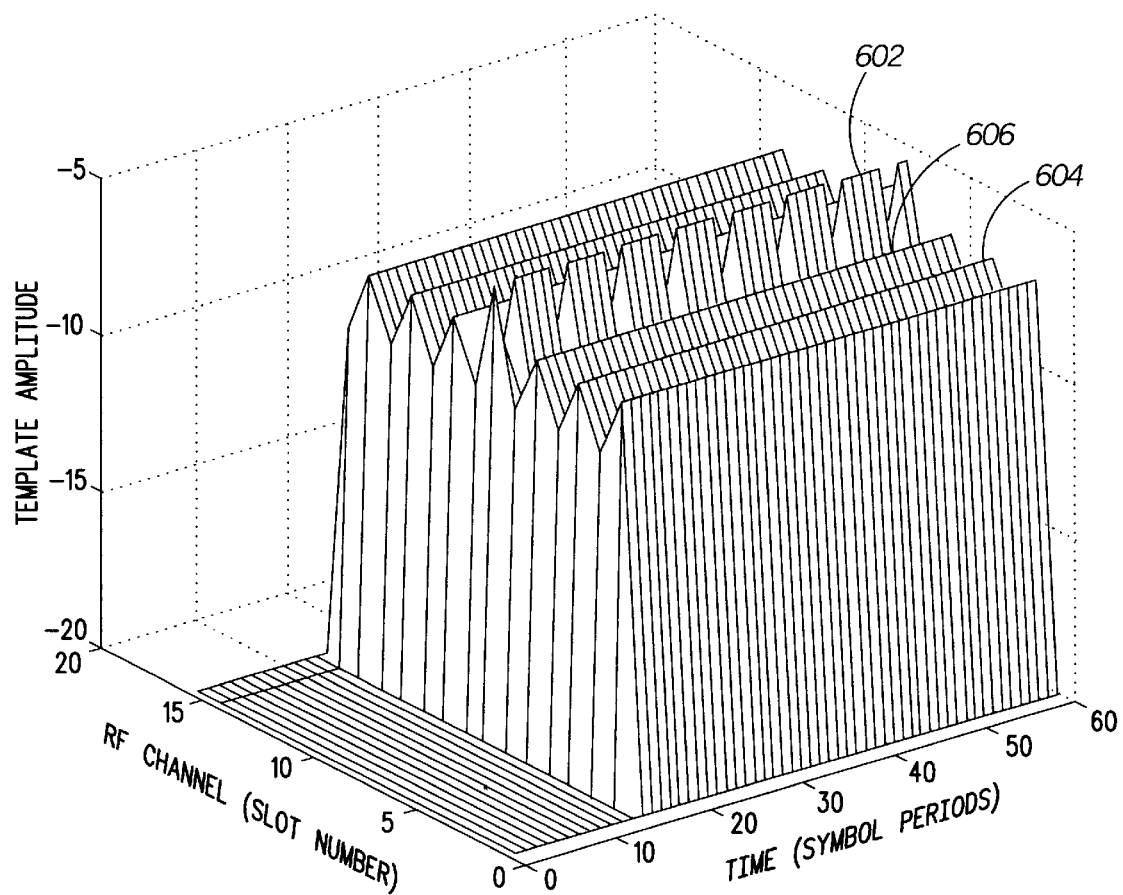
FIG. 6 is an exemplary template diagram depicting allowable distortion as a function of time and channel in accordance with the present invention.

The peak processing in this case has to create a minimal adjustment to the input symbols in order to correct for a peak. A peak detector is used to locate the peak, and the amplitude excess, phase angle, and time of the peak will be recorded. Some or all of the symbols that contribute to the peak will be adjusted so that they work coherently at the time of the peak to reduce the peak to a desired level. Not all symbols will be adjusted by the same amount. Pilot symbols can be moved an amount different from data symbols. Symbols from high order constellations will be moved less than symbols from low order constellations. Adjustments can be made on silent channels by generating "dummy" symbols thereon. This time-frequency diversity is illustrated in FIG. 6, which is a diagram of an exemplary signal template 600 depicting allowable distortion as a function of time and channel in accordance with the present invention. The signal template amplitude is a factor that determines the amount by which each input symbol on each subchannel can be adjusted. The signal template diagram depicts data symbol locations 602 that are allowed to be adjusted a greater amount than pilot symbol locations 606. The signal template diagram also depicts empty (i.e., currently unused) channels 604 which can also be "adjusted" by the signal template amplitude to reduce peaks in the active data channel(s).

One of the nice results of the time-frequency diversity is that system designer has great control over splatter. The algorithm may be modified to be splatter-free or, better yet, to allow controlled amounts of splatter into adjacent subchannels.

Figure 7:
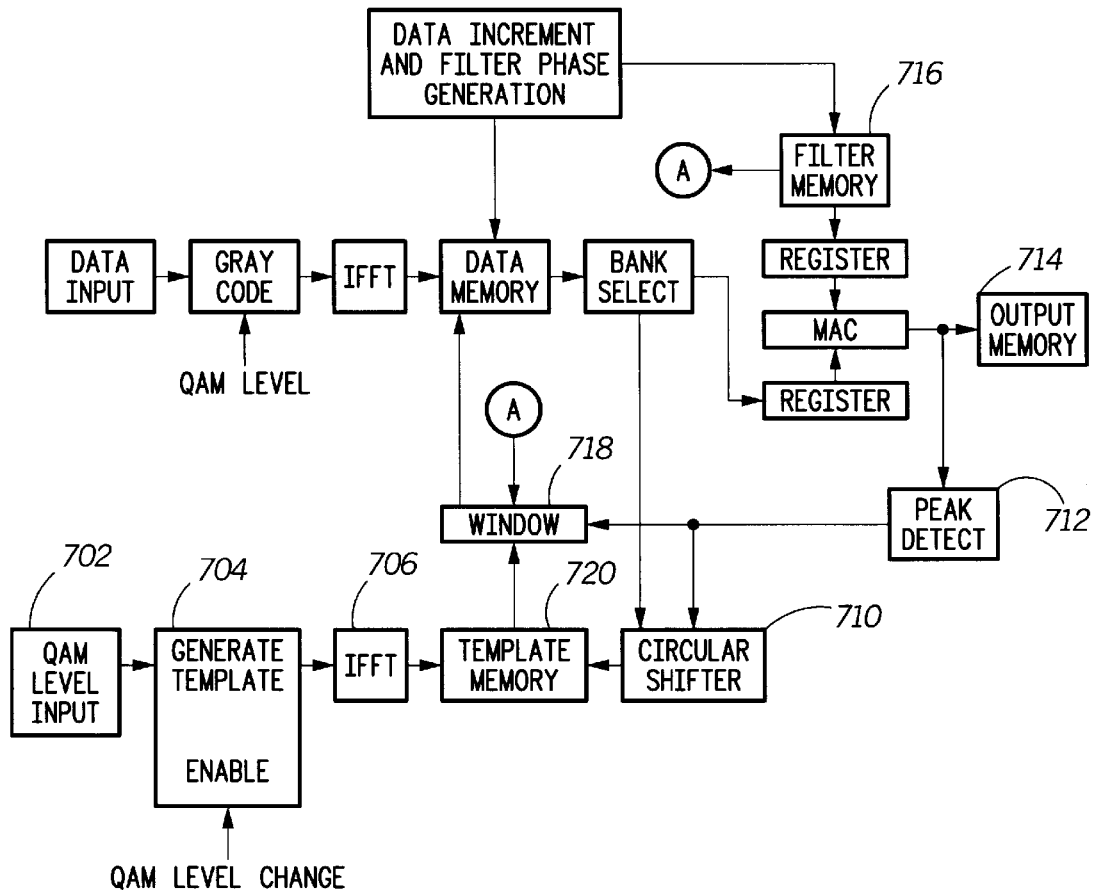
FIG. 7 is a diagram depicting a processing architecture of a modulator and the exemplary peak limiter in accordance with the present invention.

FIG. 7 is a diagram depicting a processing architecture of the exemplary peak limiter in accordance with the present invention. The QAM level input 702 specifies the QAM level and symbol type (4-QAM, 16-QAM, pilot symbol, data, silence, etc.) of each subchannel and symbol position to the template generator 704, so that the template of FIG. 6 can be built. An inverse fast Fourier transform (IFFT) 706 is then performed on the template, and the transformed values are stored in a template memory 720. A window element 718 cooperates with a peak detector 712, a circular shifter 710, a filter memory 716, and the template memory 720 to adjust the input symbols in a data memory to control the peak power of the modulator in accordance with the following mathematical description.

Symbols are modulated by the modulator 102 according to the following equation:

$$x(n) = x_r(s) = \sum_{m=0}^{N_s-1} g_{\phi_f}(m) x_r\left(\left\lfloor \frac{nD}{I} \right\rfloor - m\right)$$

where $x(n)$ is the nth sample of the modulator output, $x_r(s)$ is the sth sample of the rth filter bank, $N_s$ is the number of stored phases of the filter response, $g_{\phi_f}(m)$ is the filter phase corresponding to the mth input sample, and D and I are the decimation rate and the interpolation rate, respectively, of the filter bank.

The above equation completely describes the data increment generation and bank select operation referred to in FIG. 7. The filter phase generation is as follows:

$$\phi_f = (rD + sMD \bmod(I)) = n \bmod(I).$$

where r is the filter bank index, and M is the total number of filter banks.

Correct adjustments are performed as follows. The adjustment is a function of the template and will be added to the current input data after the data has been transformed by the IFFT. Below is a derivation of the proper adjustments, first prior to IFFT, and then post-IFFT, as used in the preferred embodiment.

First the angle of the pre-IFFT adjustment will be determined, and then the magnitude. Suppose a peak is detected at $n=n_p$, above the peak threshold in amplitude by an amplitude excess of p with angle $\phi_p$. All symbols in the adjustment should produce a coherent contribution in the opposite direction of the peak at $n=n_p$. Therefore, the angle of the adjustment for the mth symbol on the kth subchannel is:

$$\angle X_k(m) = \phi_p + \pi - \frac{2\pi k r_p}{M}$$

where $r_p = n_p \bmod(M)$ and corresponds to the output bin index of the filter bank at the time of the peak. The three components of the phase contribution include the angle of the peak, a 180° phase shift, and a component to compensate for the subchannel carrier phase at the time of the peak.

The desired symbol adjustment of the mth symbol on the kth subchannel due to a peak exceeding the predetermined threshold is given by the following expression.

$$\delta_k\left(\left\lfloor \frac{n_p D}{I} \right\rfloor - m\right) = e^{j(\pi + \phi_p)} c_l w_k\left(\left\lfloor \frac{n_p D}{I} \right\rfloor - m\right) g_{\phi_{f_{pk}}}(m) e^{-j\frac{2\pi k r_p}{M}}$$

where $w_k(m)$ is the template value on subchannel k at the symbol time m, and $$g_{\phi_{f_{pk}}}(m)$$

(m) is the phase of the pulse shaping filter at the time of the peak. The template is determined such that the weight is inversely proportional to the sensitivity of the type of modulation to amplitude and phase errors, but can be adapted when necessary to suit the application. $c_l$ is used to properly scale the adjustments, and is determined as follows.

The equivalent post-IFFT symbol amplitude adjustment of the mth symbol on the kth subchannel is:

$$\Delta_k = c_l e^{j(\pi+\phi_p)} g_{\phi_{f_{pk}}}(m) t_{(r-r_p) \bmod(M)}(m)$$

$$= c_l e^{j(\pi+\phi_p)} g_{\phi_{f_{pk}}}(m) \sum_{k=0}^{M-1} w_k(m) e^{j\left(\frac{2\pi}{M} k(r-r_p) \bmod(M)\right)}$$

where $t_r(m)$ is the IFFT of the template, $w_k(m)$, as follows.

$$t_r(m) = \sum_{k=0}^{M-1} w_k(m) e^{j\left(\frac{2\pi}{M} kr\right)},$$

The template is not a function of the time, amplitude or location of the peak, but is completely determined by the type of symbol being adjusted and the subchannel used to send the symbol, and it changes very slowly with time. The template is completely defined prior to the detection of a peak. The adjustment $\Delta_k$ is the adjustment that is added to the post-IFFT data. The only thing that remains is to determine the amplitude factor, $c_l$.

The amplitude by which the detected peak exceeds the clipping threshold is p. A multiplicative factor, a>1, is used reduce the amplitude of the peak below the clipping threshold. The factors a and p can be used to determine the multiplicative factor, $c_l$ of the preferred embodiment, as follows.

The amplitude impact of the symbol adjustments at the time of the peak is determined by substituting the post-IFFT adjustments into the modulation equation, $$x(n) = x_r(s) = \sum_{m=0}^{N_s-1} g_{\phi_f}(m) x_r\left(\left\lfloor \frac{nD}{I} \right\rfloor - m\right), \text{ yielding:}$$

$$ap = \left| c_1 e^{j(\pi+\phi_p)} \sum_{m=0}^{N_s-1} g_{\phi_{f_{pk}}}(m) g_{\phi_{f_{pk}}}(m) t_{(r-r_p) \bmod(M)}\left(\left\lfloor \frac{n_p D}{I} \right\rfloor - m\right) \right|,$$

$$\text{or } c_l \left| \sum_{m=0}^{N_s-1} g^2_{\phi_{f_{pk}}}(m) t_{(r-r_p) \bmod(M)}\left(\left\lfloor \frac{n_p D}{I} \right\rfloor - m\right) \right| = ap.$$

Finally, $c_l$ is given by $$c_l = \frac{ap}{\left| \sum_{m=0}^{N_s-1} g^2_{\phi_{f_{pk}}}(m) t_{(r-r_p) \bmod(M)}\left(\left\lfloor \frac{n_p D}{I} \right\rfloor - m\right) \right|}$$

where $n_p$ is the IFFT of the template, $w_k(m)$. This completely defines the needed adjustments for the post-IFFT input symbols in response to a peak.

Figure 8:
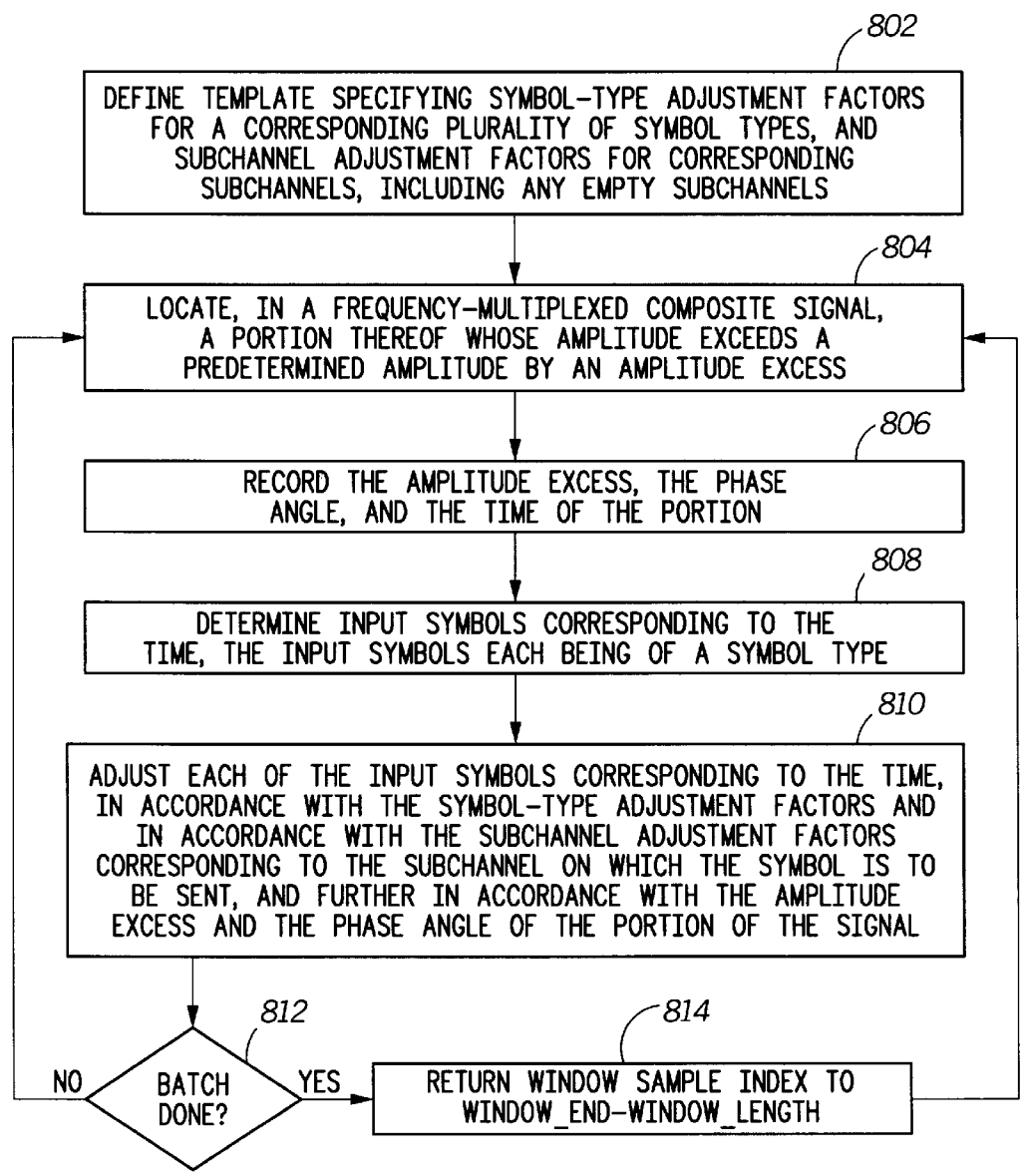
FIG. 8 is a flow diagram depicting operation of the exemplary peak limiter in accordance with the present invention.

FIG. 8 is a flow diagram describing the operation of the exemplary peak limiter in accordance with the present invention. The flow begins with the processing system 108 defining 802 the template of FIG. 6, preferably specifying both symbol-type adjustment factors for a corresponding plurality of symbol types, and subchannel adjustment factors for corresponding subchannels, including empty subchannels. It will be appreciated that, alternatively, for the case of a one-channel embodiment, only symbol-type adjustment factors will be defined in accordance with the present invention.

Next, the processing system 108 begins the window operation depicted in FIGS. 4 and 5 to locate 804 in the frequency-multiplexed composite signal a portion of the signal whose amplitude exceeds a predetermined threshold, e.g., the clipping level of the transmitter 100, by an amplitude excess. The processing system 108 then records 806 the amplitude excess, the phase angle of the amplitude excess (same as the phase angle of the signal), and the time, e.g., sample index, of the portion. The processing system 108 then determines 808 input signals contributing to the amplitude excess corresponding to the time of the amplitude excess, the input symbols each being of a symbol type, e.g., 4-QAM, 16-QAM, pilot, silence. The processing system 108 then adjusts 810 each of the input symbols corresponding to the time, in accordance with the symbol-type adjustment factors and in accordance with the subchannel adjustment factors corresponding to the subchannel on which the symbol is to be sent, and further in accordance with the amplitude excess, p, and the phase angle of the portion of the signal, $\phi_p$, as described herein above.

The processing system 108 then checks whether the batch (i.e., the samples from the point at which the window went active, through the look-ahead range) has been completed. If not, the flow returns to step 804 to search for another peak. If the batch is done, the flow moves to step 814, where the processing system 108 sets the sample index to (WINDOW_END-WINDOW_LENGTH) and returns to step 804 to continue processing data.

Performance evaluations on an embodiment of a modulator for generating a pilot symbol assisted quadrature amplitude modulation (PSAQAM) multi-subchannel signal have demonstrated that the peak to average power ratio of the multi-subchannel signal advantageously is reduced from 14 dB (without peak limiting) to about 3 dB with a peak limiter in accordance with the present invention. The large reduction in peak to average power ratio provided by the present invention enables a substantial reduction in transmitter cost and size, and greatly improved power amplifier efficiency.

Thus, it should be clear from the preceding disclosure that the present invention advantageously provides an improved method and apparatus for peak limiting in a modulator. Advantageously, the method and apparatus allows control of the peak compression in accordance with the type of information being sent and can tailor symbols on multiple subchannels, including empty subchannels, in a controlled, individualized manner to improve the peak to average power ratio, while keeping symbol distortion within acceptable levels.

Many modifications and variations of the present invention are possible in light of the above teachings. Thus, it is to be understood that, within the scope of the appended claims, the invention can be practiced other than as specifically described herein above.

What is claimed is:

1. A method for peak limiting in a modulator that generates a frequency-multiplexed composite signal including a plurality of symbols, the method comprising the steps of:

defining a signal template specifying a plurality of allowable distortion amounts for a corresponding plurality of symbol types;

locating in the frequency-multiplexed composite signal a portion of the frequency-multiplexed composite signal whose amplitude exceeds a predetermined threshold by an amplitude excess;

recording the amplitude excess, a phase angle, and a time of the portion;

determining an input symbol corresponding to the time, the input symbol being of a symbol type; and adjusting the input symbol in accordance with one of the plurality of allowable distortion amounts corresponding to the symbol type, and further in accordance with the amplitude excess and the phase angle, thereby bringing the amplitude below the predetermined threshold.

2. The method of claim 1, wherein the defining step comprises the step of further defining the signal template by specifying a plurality of subchannel adjustment factors for a corresponding plurality of subchannels, and wherein the adjusting step comprises the step of adjusting a plurality of input symbols corresponding to the plurality of subchannels in accordance with the plurality of subchannel adjustment factors.

3. The method of claim 1, wherein the defining step comprises the step of further defining the signal template by specifying a plurality of subchannel adjustment factors for a corresponding plurality of subchannels, at least one of the plurality of subchannels being an empty subchannel, and wherein the method further comprises the step of generating a symbol on the empty subchannel to bring the amplitude below the predetermined threshold.

4. The method of claim 1, wherein the locating, recording, determining, and adjusting steps are performed iteratively on a section of the frequency-multiplexed composite signal.

5. The method of claim 1, wherein the locating, recording, determining, and adjusting steps are performed a plurality of times throughout a predetermined time window before moving the window to a next section of the frequency-multiplexed composite signal.

6. A peak limiter for peak limiting in a modulator that generates from input symbols a frequency-multiplexed composite signal including a plurality of symbols, the peak limiter comprising:

a processing system coupled to the frequency-multiplexed composite signal for processing the input symbols to peak limit the frequently-multiplexed composite signal, wherein the processing system is programmed to:

define a signal template specifying a plurality of allowable distortion amounts for a corresponding plurality of symbol types;

locate in the frequency-multiplexed composite signal a portion of the frequency-multiplexed composite signal whose amplitude exceeds a predetermined threshold by an amplitude excess;

record characteristics including the amplitude excess, a phase angle, and a time of the portion;

determine an input symbol corresponding to the time, the input symbol being of a symbol type included in the plurality of symbol types; and adjust the input symbol in accordance with one of the plurality of allowable distortion amounts corresponding to the symbol type, and further in accordance with the amplitude excess and the phase angle, thereby bringing the amplitude below the predetermined threshold.

7. The peak limiter of claim 6, wherein the processing system is further programmed to:

further define the signal template by specifying a plurality of subchannel adjustment factors for a corresponding plurality of subchannels; and adjust a plurality of input symbols corresponding to the plurality of subchannels in accordance with the plurality of subchannel adjustment factors.

8. The peak limiter of claim 6, wherein the processing system is further programmed to:

further define the signal template by specifying a plurality of subchannel adjustment factors for a corresponding plurality of subchannels, at least one of the plurality of subchannels being an empty subchannel, and generate a symbol on the empty subchannel to bring the amplitude below the predetermined threshold.

9. The peak limiter of claim 6, wherein the processing system is further programmed to locate the portion, record the characteristics, determine the input symbol, and adjust the input symbol iteratively on a section of the frequency-multiplexed composite signal.

10. The peak limiter of claim 6, wherein the processing system is further programmed to locate the portion, record the characteristics, determine the input symbol, and adjust the input symbol a plurality of times throughout a predetermined time window before moving the window to a next section of the frequency-multiplexed composite signal.

11. A transmitter for generating an amplified radio frequency (RF) signal, the transmitter comprising:

a modulator for generating from input symbols a frequency-multiplexed composite signal including a plurality of symbols;

an upconverter coupled to the modulator for upconverting the frequency-multiplexed composite signal to generate an RF signal; and a power amplifier coupled to the upconverter for amplifying the RF signal to produce the amplified RF signal;

wherein the modulator includes a peak limiter, comprising:

a processing system coupled to the frequency-multiplexed composite signal for processing the input symbols to peak limit the frequency-multiplexed composite signal, wherein the processing system is programmed to:

define a signal template specifying a plurality of allowable distortion amounts for a corresponding plurality of symbol types;

locate in the frequency-multiplexed composite signal a portion of the frequency-multiplexed composite signal whose amplitude exceeds a predetermined threshold by an amplitude excess;

record characteristics including the amplitude excess, a phase angle, and a time of the portion;

determine an input symbol corresponding to the time, the input symbol being of a symbol type included in the plurality of symbol types; and adjust the input symbol in accordance with one of the plurality of allowable distortion amounts corresponding to the symbol type, and further in accordance with the amplitude excess and the phase angle, thereby bringing the amplitude below the predetermined threshold.

12. The transmitter of claim 11, wherein the processing system is further programmed to:

further define the signal template by specifying a plurality of subchannel adjustment factors for a corresponding plurality of subchannels; and adjust a plurality of input symbols corresponding to the plurality of subchannels in accordance with the plurality of subchannel adjustment factors.

13. The transmitter of claim 11, wherein the processing system is further programmed to:

further define the signal template by specifying a plurality of subchannel adjustment factors for a corresponding plurality of subchannels, at least one of the plurality of subchannels being an empty subchannel, and generate a symbol on the empty subchannel to bring the amplitude below the predetermined threshold.

14. The transmitter of claim 11, wherein the processing system is further programmed to locate the portion, record the characteristics, determine the input symbol, and adjust the input symbol iteratively on a section of the frequency-multiplexed composite signal.

15. The transmitter of claim 11, wherein the processing system is further programmed to locate the portion, record the characteristics, determine the input symbol, and adjust the input symbol a plurality of times throughout a predetermined time window before moving the window to a next section of the frequency-multiplexed composite signal.

* * * * *